United States Patent
Glaspie (12)

(10) Patent No.: US 6,736,575 B2
(45) Date of Patent: May 18, 2004

(54) LINEAR BROACH MACHINING SYSTEM

(75) Inventor: Kevin J. Glaspie, Jackson, MI (US)

(73) Assignee: The Crankshaft Machine Group, a division of Avis Industrial Corp., Jackson, MI (US)

( * ) Notice: Subject to any disclaimer, the term of this patent is extended or adjusted under 35 U.S.C. 154(b) by 164 days.

(21) Appl. No.: 09/739,593

(22) Filed: Dec. 19, 2000

(65) Prior Publication Data

US 2002/0076287 A1 Jun. 20, 2002

(51) Int. Cl.⁷ .......................... B23D 37/18; B23D 37/22
(52) U.S. Cl. .................. 409/244; 409/262; 409/257; 409/268; 409/277; 409/287; 82/106
(58) Field of Search .................. 409/262, 244, 409/272, 278, 250, 251, 252, 256, 257, 263, 268, 270, 269, 276, 277, 279, 282, 286, 287; 29/6.01; 82/106, 107

(56) References Cited

U.S. PATENT DOCUMENTS

| | | | |
|---|---|---|---|
| 1,244,785 A | | 10/1917 | Sessions |
| 2,088,119 A | | 7/1937 | Schiltz |
| 2,191,193 A | | 2/1940 | Ross |
| 2,280,229 A | * | 4/1942 | Groene et al. ............... 409/272 |
| 2,523,301 A | | 9/1950 | Hodson et al. |
| 2,838,980 A | * | 6/1958 | Babcock ..................... 409/262 |
| 3,316,813 A | * | 5/1967 | Wenig ......................... 409/262 |
| 3,889,573 A | * | 6/1975 | Girardi ....................... 409/262 |
| 4,204,786 A | * | 5/1980 | Deprez ....................... 409/262 |
| 4,801,226 A | * | 1/1989 | Gleason ...................... 409/252 |
| 5,025,689 A | * | 6/1991 | Mayer ......................... 82/106 |

FOREIGN PATENT DOCUMENTS

| | | | |
|---|---|---|---|
| DE | 3340830 A1 | * | 5/1985 |
| JP | 63-89217 A | * | 4/1988 |

OTHER PUBLICATIONS

Printout from Detroit Broach website (http://www.db-cbroach.com) titled "Types of Broaching Machines", 6 pages, copyright 199.*

* cited by examiner

Primary Examiner—William Briggs
Assistant Examiner—Erica E Cadugan
(74) Attorney, Agent, or Firm—Young & Basile, P.C.

(57) ABSTRACT

A linear broaching machine for machining rotating parts wherein a plurality of tooling carriages are mounted upon a moving chain and broach type tools are supported by the carriages wherein the tools are moved in a linear path into engagement with a rotating workpiece to remove metal from the workpiece and form an accurately sized cylindrical surface concentric to the workpiece axis of rotation. The tool carriages are spaced from each other providing non-machining access durations wherein the workpiece may be loaded or unloaded from its rotating support spindles.

8 Claims, 5 Drawing Sheets

LINEAR BROACH MACHINING SYSTEM

BACKGROUND OF THE INVENTION

1. Field of the Invention

The invention pertains to the machining of rotating workpieces by the use of broaching tools sequentially brought into engagement with the workpiece for removing metal therefrom.

2. Description of the Related Art

It is known to mount a plurality of workpieces on a moving chain and move the workpieces past a fixed tool such as shown in U.S. Pat. Nos. 2,088,119 and 2,191,193. Further, it is known to mount a tool upon a moving chain, such as in a power chain saw, and attention is directed to U.S. Pat. Nos. 1,244,789 and 2,523,301.

However, the advantages of mounting a plurality of tools in such a manner as to permit the tools to be sequentially moved past a rotating workpiece in order to permit rapid metal removal from the workpiece and yet accurately control such removal and sizing of the workpiece has not been previously appreciated. It is this concept of the linear movement of broach type workpieces past a rotating workpiece with which the invention deals.

OBJECTS OF THE INVENTION

An object of the invention is to provide a broach machine tool system for use with a rotating workpiece wherein a high rate of production can be achieved at a high level of accuracy.

Another object of the invention is to provide a broach type machine tool for removing metal from a rotating workpiece wherein the tool moves in a linear path while engaging the workpiece.

A further object of the invention is to provide a broach type machine tool capable of removing metal from a rotating workpiece wherein a plurality of broach type tools are mounted upon a chain in a spaced manner wherein workpieces may be loaded and unloaded from supporting spindles intermediate machining operations.

SUMMARY OF THE INVENTION

In the practice of the invention, the linear broach machine includes a frame having spaced opposed rotating spindles defining a workpiece axis of rotation. One or both of the spindles can be powered by a controlled drive unit, and each of the spindles includes clamping mechanism whereby the workpiece may be accurately supported at each end. The machine of the invention was created particularly for heavy duty turning, such as turning the main bearings for internal combustion engine crankshafts. However, it will be appreciated that the invention may be utilized in any turning operation and is particularly suitable in those situations where it is desired to remove a considerable amount of metal in a relatively short time under high conditions of accuracy and tool life.

In the preferred embodiment of the invention, a combination of sprockets are located in a triangular relationship whereby the tool carriers may be mounted upon spaced parallel chains guided by the sprockets wherein the carriers will move through a triangular path. It is possible to only use two combinations of chain sprockets in the broad concept of the invention, but the use of three combinations of sprockets permits a greater length of chain to be used permitting a greater number of tool carriers to be mounted upon the chain, thereby providing increased flexibility of tool carrier spacing and the rate of chain movement.

Two of the chain sprocket combinations are spaced in such a relationship as to cause the tool carriers mounted upon the chains to move in a path of movement transverse, normally perpendicular, to the axis of workpiece rotation. In this manner, broaching tools mounted upon the tool carriers will move past the workpiece in a tangential manner. Preferably, the two chain sprocket combinations positioning the tool carriers during a cutting action are vertically spaced wherein the tool carriers and tools are moving in a downward direction during cutting.

Usually, two or more broaching turning tools are mounted upon a tool carrier, each subsequent tool being located closer to the axis of workpiece rotation wherein the last cutting tool will produce the finished diameter. With some turning operations, the broaching and turning tools necessary to make an entire cut may be located on adjacent tool carriers if it is necessary that three or four tools are required for a machining operation.

The tool carriers may be spaced along the chain as desired, and usually, sufficient spacing will exist between the carriers necessary to perform a workpiece operation, and the rate of tool carrier movement is such, that after turning, the workpiece spindles may be stopped, the finished workpiece removed from its supporting spindles, and a new workpiece mounted upon the spindles such that the next series of tools will engage the new workpiece and the turning cycle repeated with a new set of tools without stopping the tool carriage movement. The chain mounting of the tool carriers and tools permits a high rate of production with minimal wear upon any given tool, and turning machines constructed in accord with the invention are capable of high production turning operations for extended periods of time between tool replacement.

To ensure accuracy, the tool carriers are held upon a rigid bedway mounted on the machine frame during cutting. The tool carriers include guide surfaces firmly held against bedway guide surfaces (bearings) and as the bedway is well lubricated, it is possible to support the tool carriers on the bedway during cutting in a relatively movable relationship and yet hold the necessary tolerances to achieve accurate tool removal without chattering.

It will be appreciated that the aforedescribed machine meets all of the objects of the invention as set forth above.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
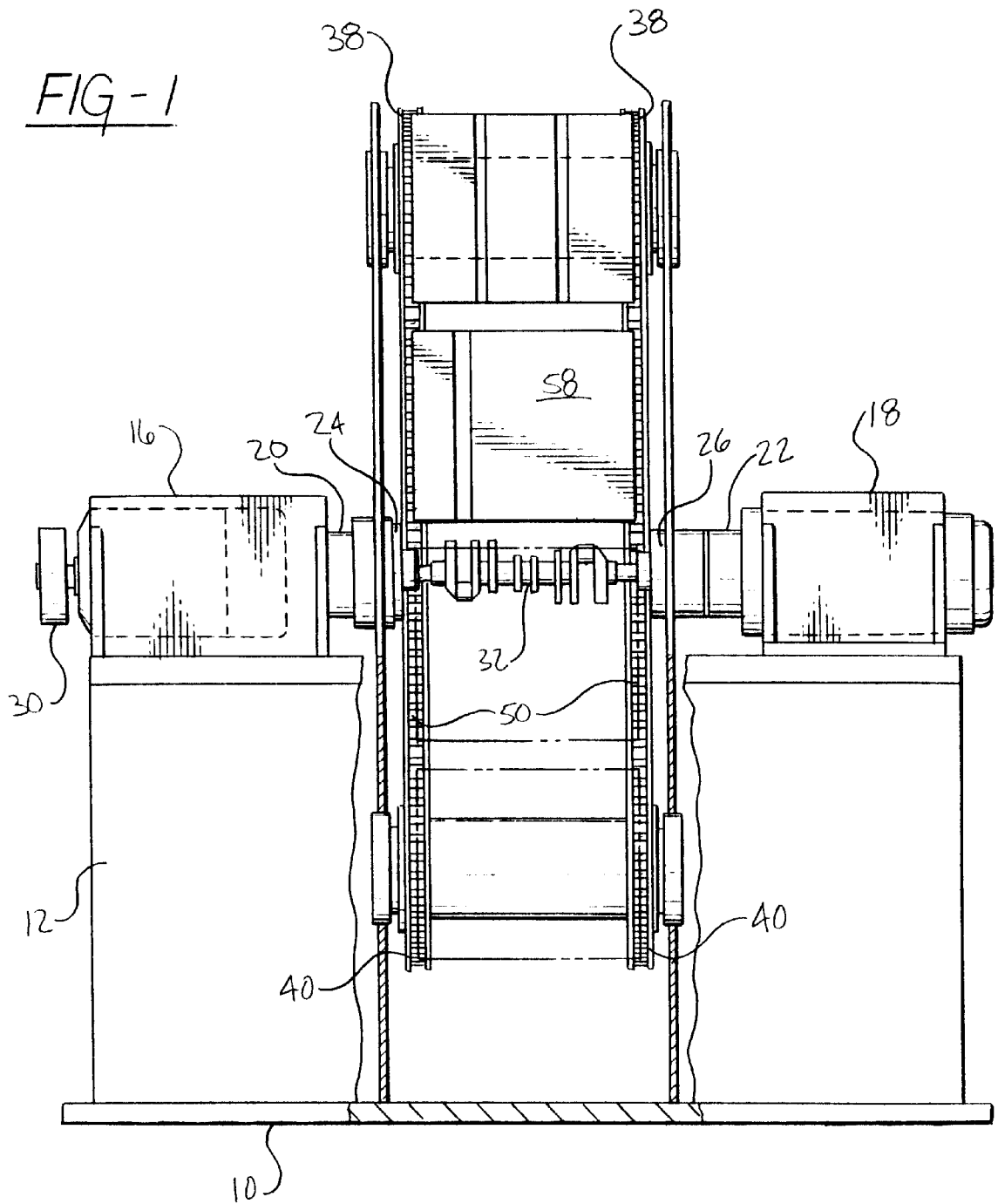
FIG. 1 is a front elevational partially broken away view of a linear broach machine in accord with the invention.
Figure 2:
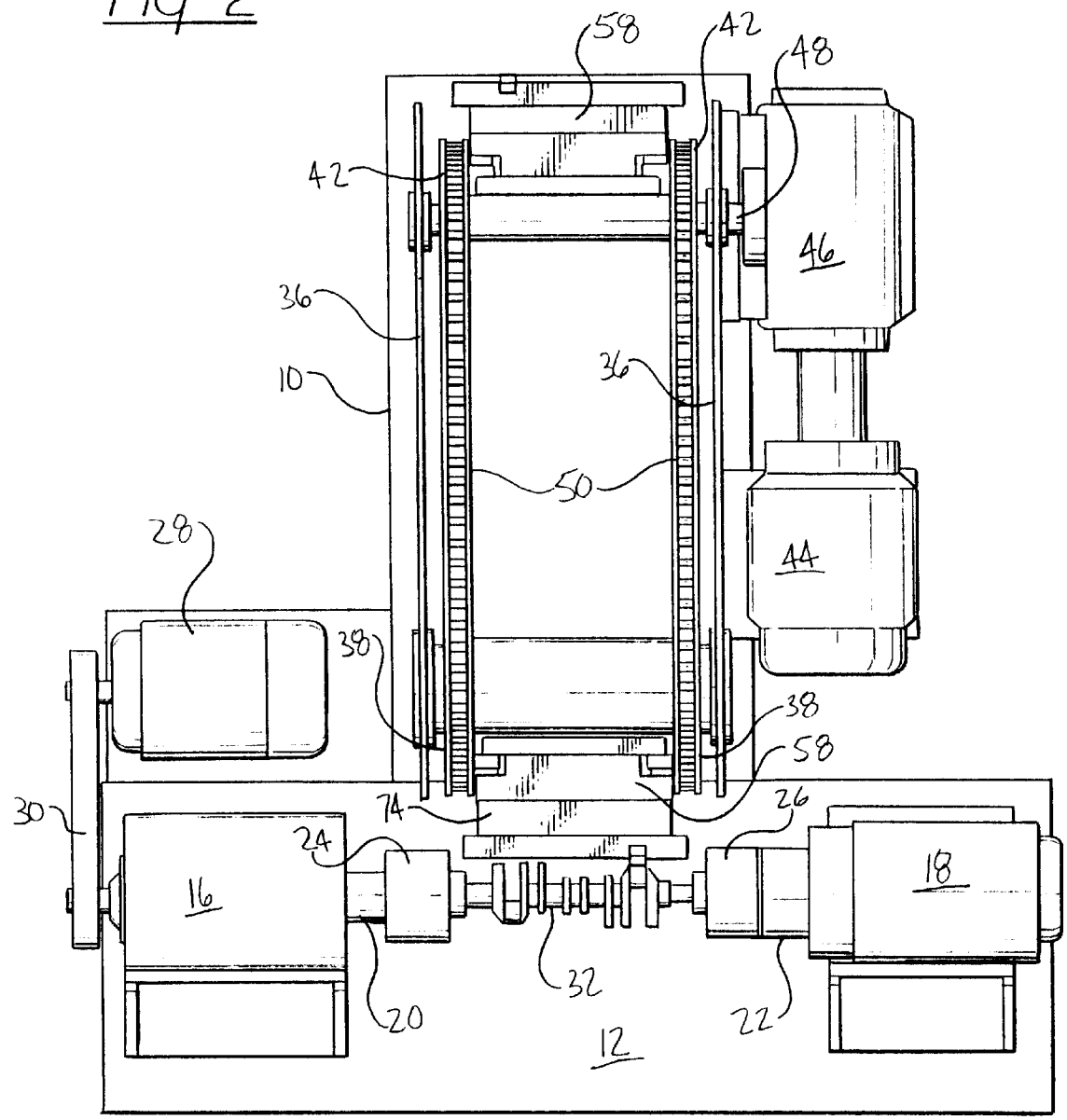
FIG. 2 is a top plan view of the machine of FIG. 1.

The machine of the invention includes a frame whose basic component is the frame plate 10 which constitutes the base for the spindle support cabinet 12 and the chain support structure 14. Spindle housings 16 and 18 are mounted upon the spindle support 12, and these housings rotatably support spindles 20 and 22, respectively. The spindle 20 supports the workpiece chuck 24 while the workpiece chuck 26 is mounted upon the spindle 22. The spindle 20 is rotated by the controlled drive unit 28, FIG. 2, drivingly connected to spindle 20 by the power transmission component 30.

The workpiece 32 is affixed between the chucks 24 and 26 for rotation by the controlled drive unit 28. The workpiece 32 defines the axis of rotation of the apparatus. In the drawings, the workpiece 32 constitutes a crankshaft for internal combustion engines having main bearings 34 which are concentric to the axis of rotation. It will be understood that the particular configuration of the workpiece 32 constitutes no part of the invention as any workpiece to be shaped by turning may be supported upon the chucks 24 and 26.

Figure 3:
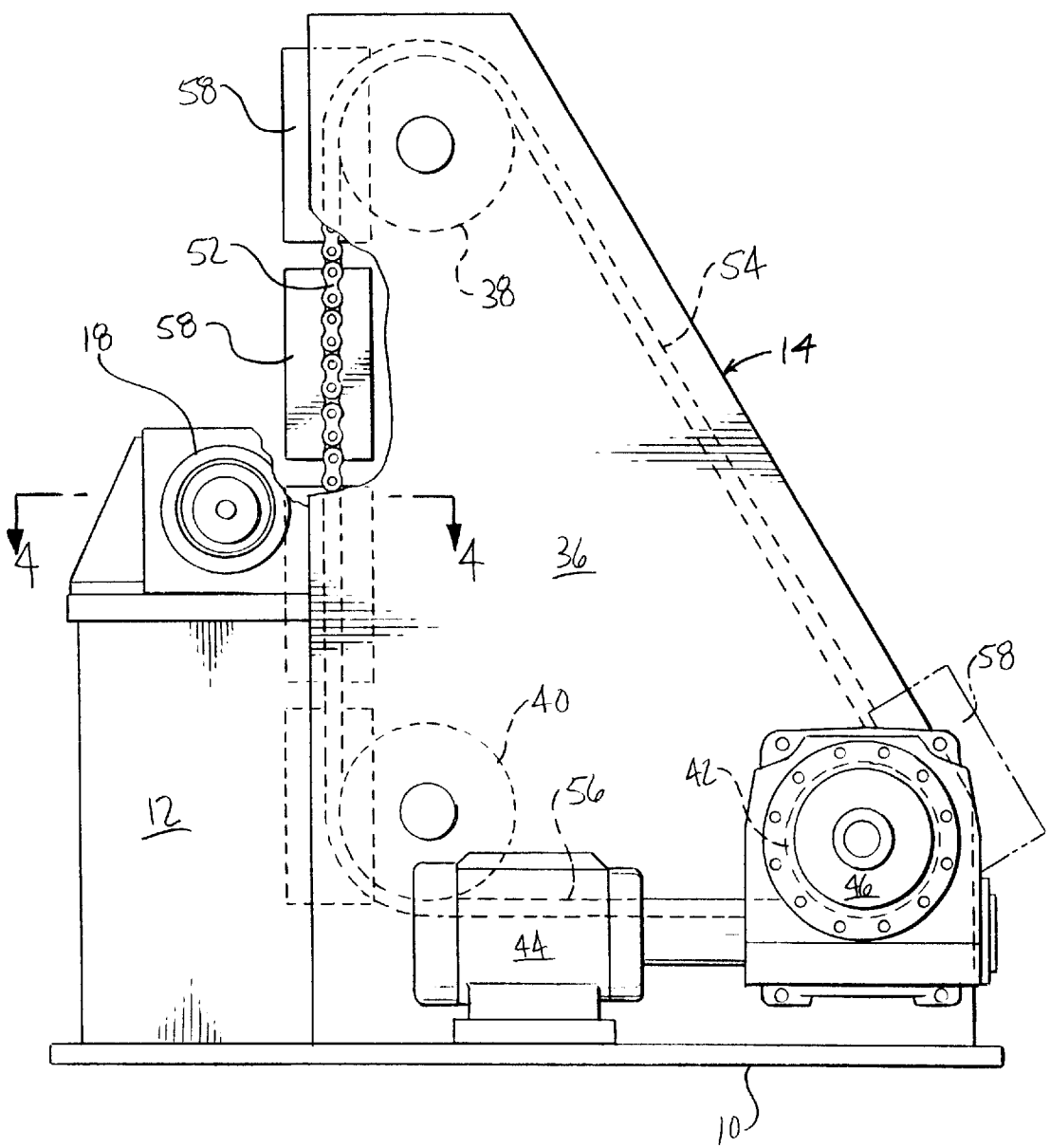
FIG. 3 is an elevational view, partially broken, illustrating the machine of FIG. 1 as taken from the right side thereof.

Behind the spindle support 12, a pair of spaced parallel vertically extending sprocket supporting plates 36 are affixed to and arise from the frame base 10. The sprocket plates 36 constitute the support for the three chain sprockets, each sprocket actually constituting a pair of axially aligned sprockets rotatably mounted upon an axle, the upper sprocket is designated at 38, the lower sprocket 40 is located directly below sprocket 38, and the rear sprocket 42 is located behind the sprocket 40, and these relationships will be appreciated from FIG. 3. Each of the sprocket sets includes the usual chain links which intermesh with the teeth of the sprockets as the chain passes thereover. An controlled drive unit 44 through a transmission 46 and transmission drive shaft 48, FIGS. 2 and 3, rotates the rear sprocket set 42.

A pair of heavy duty link chains 50 extend over the sprockets 38, 40 and 42, and the chains 50 include a downwardly moving portion 52, an upwardly moving portion 54, and a rearward moving portion 56 between the sprockets 40 and 42.

Figure 4:
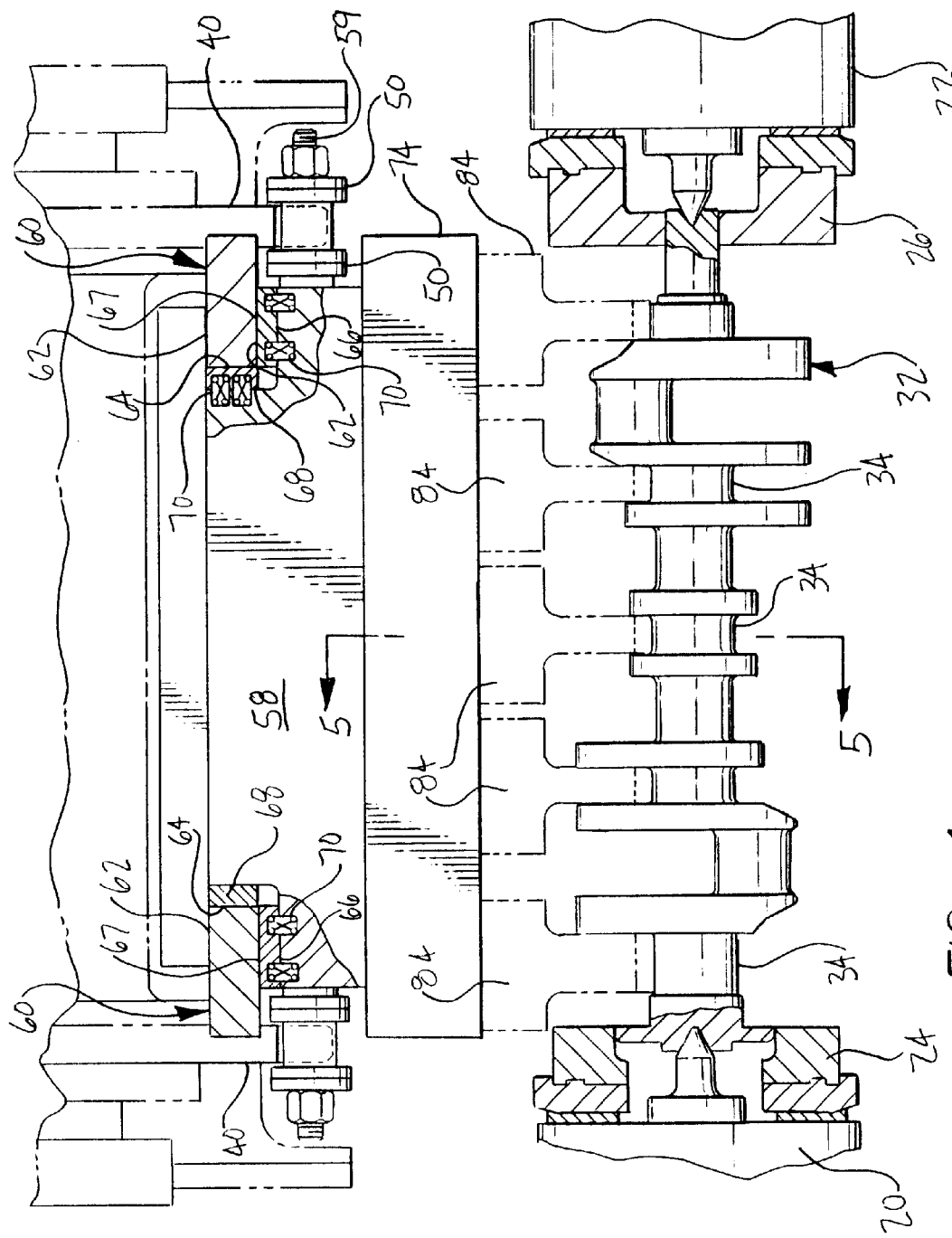
FIG. 4 is a detail plan view, partially in section, illustrating the workpiece spindles and bedway construction as taken along Section 4—4 of FIG. 3.

A plurality of tool carriers 58 are attached to and between the chains 50 by a pin or rod stud structure 59, FIG. 4. In this manner, a plurality of tool carriers 58 are affixed to the chains 50 in any spacing arrangement desired. Usually, the separation between adjacent tool carriers is substantially the same, but under certain conditions, it may be desired to stagger the tool carrier spacing for reasons later apparent.

Movement of the tool carriers 58 during the cutting action is controlled by a pair of spaced bedway guides 60, FIG. 4, rigidly affixed to the machine frame. The bedway guides each define oppositely positioned flat guide surfaces 62 whose planes are parallel to the axis of rotation. Also, the bedway guides 60 include inner end surfaces 64.

Each of the tool carriers 58 includes bearing structure which slidably engages the guide surfaces of the bedway guides 60. The tool carrier bearings 66 engage one of the guide surfaces 62, while the tool carriage includes a guide surface 67 engaging the bedway guide surfaces 62 closest to the workpiece axis of rotation. End bearings 68 carried by the tool carriers 58 engage the flat bedway guide end surfaces 64. Spring 70, FIG. 4, bear against the bearings of the tool carriages, and upon the locking structure for the tool carriages' bearings, not shown, being loosened, the springs 70 will bias the bearings against the bedway guide surfaces. In this manner, the tolerances between the bedway guide 60 and the bearings of the tool carriers can be controlled to prevent tool chattering, and the bearings 66 and 68 will be firmly held against the bedway guide surfaces 60 once they are firmly locked to the tool carrier by their threaded set screw arrangements, not shown.

Figure 5:
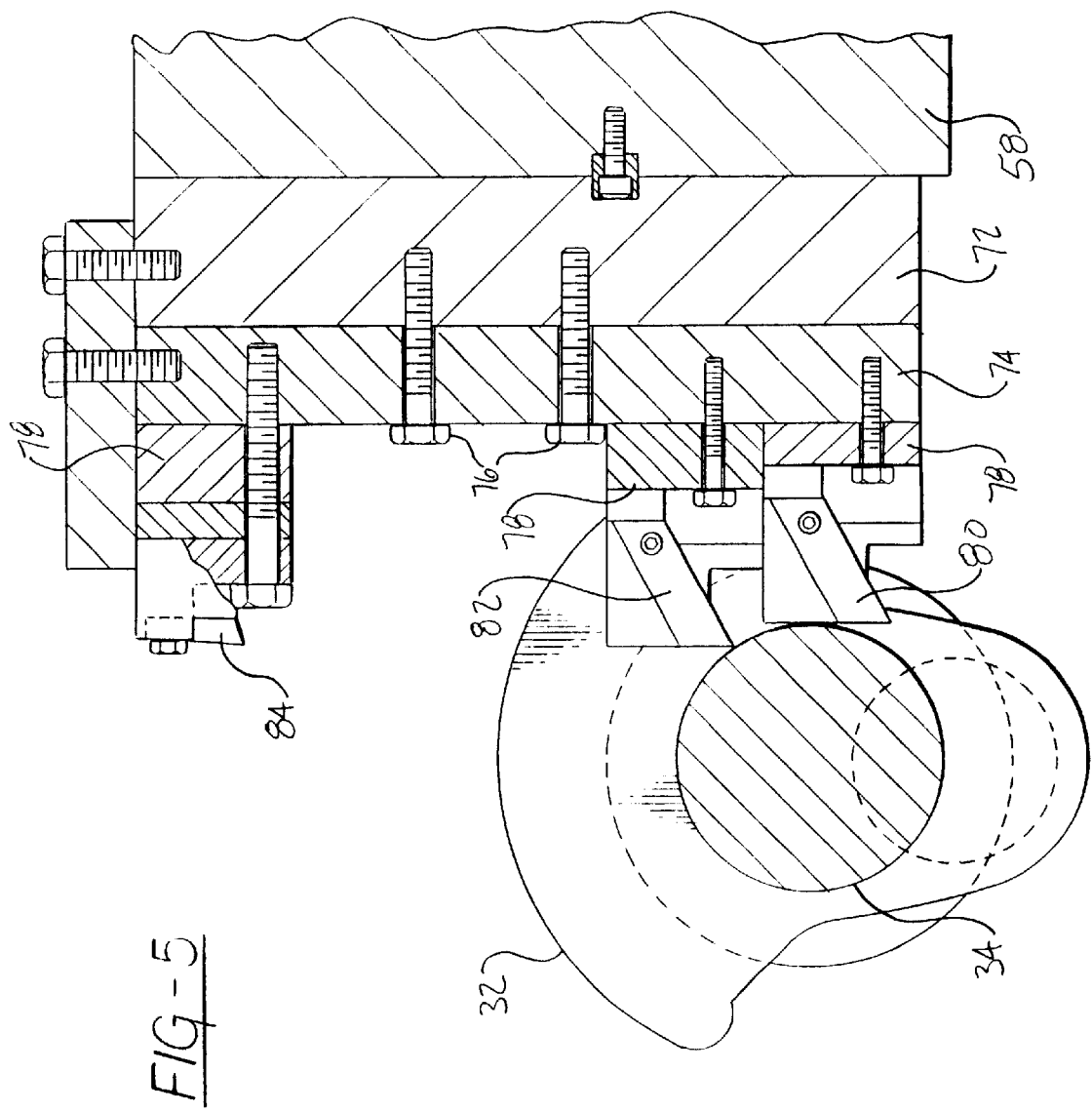
FIG. 5 is an elevational detail sectional view as taken through a tool carrier along Section 5—5 of FIG. 4.

As will be appreciated from FIG. 5, each of the tool carriers 58 supports a tool rest plate 72 and is affixed thereto by threaded fasteners, and the tool holder plate 74 is attached to the rest plate 72 by threaded fasteners or tool locking mechanism 76. The tool holders 78 are mounted upon the tool holder plate 74 by bolts or any locking mechanism, and as will be appreciated from FIG. 5, sequential broach type tools 80, 82 and 84 are mounted upon the tool holders 78, three of which are shown in the version of FIG. 5.

In operation, the workpiece 32 is mounted in the chucks 24 and 26, and upon energizing of the controlled drive unit 28, the workpiece 32 will be rotated at the desired rate of speed in a counterclockwise direction as viewed in FIG. 5. The motor 44 is energized which will drive the chains 50 in a counterclockwise direction of movement as viewed in FIG. 3. Accordingly, as the tool carriers 58 move along the bedway guides 60, the tools 80, 82 and 84 will come into sequential engagement with the workpiece 32 to remove metal from the main bearings 34 of the workpiece. As will be appreciated from FIG. 5, the tool 82 extends further toward the workpiece axis of rotation than the tool 80, and thereby will remove metal from the workpiece in a second cut. As the tool 84 moves into engagement with the workpiece main bearing 34, the fact that the finishing tool 84 is slightly closer to the axis of rotation than tool 82, the tool 84 only needs to remove a small amount of metal from the workpiece to define the desired finished diameter of the workpiece bearing 34. In most cases, the entire turning of the workpiece main bearings 34 can be accomplished by the three tools 80, 82 and 84.

From the above description, it will be appreciated that the tools moving along the bedway guides 60 on their associated tool carrier function as a broach wherein each tooth removes the appropriate amount of metal during its cutting action, which is a turning process.

It is to be understood that the chains and tool carriers 58 are being moved downwardly by the controlled drive unit 44 and transmission 46 at a rather slow rate as to not overload the tool 80, and the movement of the chains 50 is such that after the finishing tool 84 has properly sized the workpiece main bearing 34, the spindle controlled drive unit 28 may be stopped and the workpiece 32 removed from the chucks 24 and 26 and a new workpiece inserted in the clamping area. During this time of removal and reloading of workpieces, the chains 50 can continue to move the subsequent tool carrier downwardly toward the newly positioned workpiece and the tools mounted upon the subsequent tool carrier will turn the main bearings of the newly installed workpiece, and the cycle repeated.

As will be appreciated from FIG. 4, a plurality of tools may be mounted upon a tool carrier wherein all of the main bearings of the workpiece may be simultaneously machined. In FIG. 4, five main bearings are being machined which, of course, requires five sets of tools 80, 82 and 84 to be mounted upon a common tool carrier 58.

The linear broaching machine producing turning operations in accord with the aforedescribed structure is capable of the rapid machining of relatively large, yet complex, workpieces. As a different set of tools engages consecutive workpieces, the tools have adequate time to cool as the tools travel about the triangular configuration of the chains 50 as apparent from FIG. 3. While the disclosed apparatus may require a relatively large number of tools, the high production rate of the machine, and the long tool life achieved, renders this type of machine economically feasible.

It is also to be appreciated that the inventive concepts could be employed by using only a single tool carrier having tools mounted thereon. In such instance, the controls for the chain controlled drive unit 44 would accelerate chain movement between the unloading and loading of workpieces so as to maintain the desired high production rate. However, preferably, a number of sets of tools and tool carriers are mounted upon the chains so that high production can be achieved while yet attaining a long tool life.

It is appreciated that various modifications to the inventive concepts may be apparent to those skilled in the art without departing from the spirit and scope of the invention.

What is claimed is:

1. A linear broaching method for machining continuously rotating workpieces chucked within a machine comprising the steps of continuously rotating one of said workpieces about an axis of rotation during machining, linearly sequentially moving a plurality of spaced broaching tools mounted on an endless member substantially tangentially to the workpiece in a path transverse to said axis to define a linear broach tool cutting paths, engaging one of said tools with the workpiece whereby said one tool removes metal from the workpiece, and either removing the workpiece from the machine or inserting a new workpiece into the machine to be machined by the spaced broaching tools, said removing or inserting occurring during the linear sequential moving of the spaced broaching tools.

2. In a linear broaching method as in claim 1, wherein said endless member is a moving chain.

3. In a linear broaching method as in claim 2, the inserting or removing of said workpiece occurring intermediate adjacent ones of the tools being engaged with the workpiece.

4. A linear broaching machine for machining continuously rotating workpieces comprising, in combination, a frame, a continuously rotatable headstock and a tailstock mounted on said frame defining an axis of continuous rotation and each having workpiece holding means, a linear bedway defined on said frame adjacent and substantially perpendicularly disposed to said axis of rotation and having first and second ends, first and second sprockets rotatably mounted on said frame, said first and second sprockets being located adjacent said bedway first and second ends, respectively, drive means drivingly connected to at least one of said sprockets, an endless flexible tension member passing over said sprockets, said tension member always having a portion extending adjacent and substantially parallel to said bedway, a plurality of spaced tool carriers mounted upon said tension member sequentially engaging and moving along the length of said bedway, a broaching tool mounted on selected ones of the carriers, said broaching tools sequentially substantially tangentially engaging a rotating workpiece mounted upon said headstock and tailstock while the associated carrier is engaging and moving along said bedway to remove metal from the workpiece.

5. In a linear broaching machine as in claim 4, said bedway comprising spaced parallel guides each having opposed guide surfaces, one surface facing toward said axis of rotation and the other surface facing away from said axis of rotation, said tool carriers each having bearing surfaces engaging said bedway guide surfaces holding said tool carriers in a predetermined radial position to said axis of rotation.

6. In a linear broaching machine as in claim 5, said parallel guides each including a transverse guide surface transversely disposed to said axis of rotation and each of said tool carriers having a transverse bearing surface engaging said transverse guide surface holding said tool carriers in a predetermined axial position relative to said axis of rotation.

7. In a linear broaching machine as in claim 4, said flexible tension member comprising a chain and teeth defined on said sprockets engaging said chain.

8. In a linear broaching machine as in claim 7, said chain comprising two spaced sets of chains, said tool carriers being mounted between said chains.

* * * * *